United States Patent
Shangguan et al.

(10) Patent No.: US 10,043,600 B1
(45) Date of Patent: Aug. 7, 2018

(54) REINFORCED CABLE USED FOR SUBMERSIBLE PUMP

(71) Applicants: HEBEI HUATONG WIRES & CABLES GROUP CO., LTD., Tangshan, Hebei (CN); SHINDA (TANGSHAN) CREATIVE OIL & GAS EQUIPMENT CO., LTD., Tangshan, Hebei (CN)

(72) Inventors: Fengshou Shangguan, Hebei (CN); Shujun Zhang, Hebei (CN); Wei Cheng, Hebei (CN); John Wahba, Hebei (CN); Xiangjin Wu, Hebei (CN); Jianliang Duan, Hebei (CN); Jian Dong, Hebei (CN); Jiping Yuan, Hebei (CN)

(73) Assignees: HEBEI HUATONG WIRES & CABLES GROUP CO., LTD., Tangshan, Hebei (CN); SHINDA (TANGSHAN) CREATIVE OIL & GAS EQUIPMENT CO., LTD., Tangshan, Hebei (CN)

(*) Notice: Subject to any disclaimer, the term of this patent is extended or adjusted under 35 U.S.C. 154(b) by 0 days.

(21) Appl. No.: 15/673,963

(22) Filed: Aug. 10, 2017

(51) Int. Cl.
*H01B 3/28* (2006.01)
*H01B 7/24* (2006.01)
(Continued)

(52) U.S. Cl.
CPC ............ *H01B 7/046* (2013.01); *H01B 3/28* (2013.01); *H01B 7/0275* (2013.01);
(Continued)

(58) Field of Classification Search
CPC ........ H01B 7/046; H01B 3/28; H01B 7/0275; H01B 7/1895; H01B 7/24; H01B 7/2806; H01B 7/2813; H01B 7/282; E21B 43/128
(Continued)

(56) References Cited

U.S. PATENT DOCUMENTS 5,119,457 A * 6/1992 Callahan ............... G02B 6/3817
174/79
8,270,793 B2 * 9/2012 Figenschou ............ H01B 7/045
174/116
(Continued)

FOREIGN PATENT DOCUMENTS

CN 102789830 B 4/2014
CN 103943263 A 7/2014
(Continued)

OTHER PUBLICATIONS

New Century (Tianjin) Polyimide Films Insulating Materials Co., Ltd Technical Data Sheet Apr. 6, 2013 and Sep. 1, 2017.*
(Continued)

*Primary Examiner* — Timothy Thompson
*Assistant Examiner* — Michael F McAllister
(74) *Attorney, Agent, or Firm* — Novick, Kim & Lee, PLLC; Allen Xue

(57) ABSTRACT

The present application relates to a reinforced cable used for submersible pump, consisting of a fluororubber sheath, a filler, wire ropes and signal cables. The wire ropes and the signal cables are arranged in a central region of the cable; the filler is filled in the surrounding, and the fluororubber sheath is extruded outside the filler; and the signal cable comprises a conductor and an insulating bush, a sintered membrane is formed on an outer wall of the conductor, and the insulating bush is extruded outside the conductor.

7 Claims, 4 Drawing Sheets

(51) Int. Cl.
  *H01B 7/282* (2006.01)
  *H01B 7/04* (2006.01)
  *H01B 7/18* (2006.01)
  *H01B 7/02* (2006.01)
  *H01B 7/28* (2006.01)
  *E21B 43/12* (2006.01)

(52) U.S. Cl.
  CPC ............ *H01B 7/1895* (2013.01); *H01B 7/24* (2013.01); *H01B 7/282* (2013.01); *H01B 7/2806* (2013.01); *H01B 7/2813* (2013.01); *E21B 43/128* (2013.01)

(58) Field of Classification Search
  USPC .......................................................... 174/116
  See application file for complete search history.

(56) References Cited

U.S. PATENT DOCUMENTS

| | | | | |
|---|---|---|---|---|
| 8,957,312 | B2* | 2/2015 | McCullough | H01B 7/14 174/113 R |
| 2010/0000759 | A1* | 1/2010 | Lumachi | H01B 3/30 174/107 |
| 2010/0186990 | A1* | 7/2010 | Neuroth | H01B 7/045 174/120 AR |
| 2011/0005795 | A1* | 1/2011 | Deighton | H01B 7/045 174/47 |
| 2014/0049786 | A1* | 2/2014 | Knuepfer | G01B 11/02 356/634 |
| 2016/0293294 | A1* | 10/2016 | Matlack | E21B 47/12 |
| 2017/0076838 | A1* | 3/2017 | Maunder | H01B 7/041 |

FOREIGN PATENT DOCUMENTS

| | | | |
|---|---|---|---|
| CN | 205247930 U | | 5/2016 |
| CN | 105845230 A | | 8/2016 |
| CN | 206806058 | * | 5/2017 |

OTHER PUBLICATIONS

Material and process charts Mike Ashby, Engineering Department Cambridge CB2 1 PZ , UK Granta Design, Jan. 201 O.*

* cited by examiner

REINFORCED CABLE USED FOR SUBMERSIBLE PUMP

CROSS REFERENCE TO RELATED APPLICATION

The present application claims the priority of Chinese Patent Application NO. 201720687512.9, filed on Jun. 14, 2017, the disclosure of which is incorporated by reference herein in its entirety.

TECHNICAL FIELD

The present application relates to a reinforced cable used for submersible pump applied in the technical field of oil well engineering.

BACKGROUND

Cables used for submersible pumps are mainly applied in submersible pumps which usually operate underground at a depth of thousands of meters. The submersible pumps operate in harsh conditions in the oil wells, generally in environments in high temperature and high pressure and containing highly corrosive oil gases. The strength, durability and corrosion resistance of submersible pump cables are highly required. The submersible pump cables in the prior art have the following technical problems.

1. Insufficient Strength

The submersible pump cables are likely to break during the usage due to a large length and certain loads borne on the cables. To solve this problem, in the prior art, an armor layer or coiled tubing is usually provided on an outer side of the cable.

2. Low Duration and Corrosion Resistance

A common plastic sheath is provided in the outermost layer of the conventional submersible pump. Generally, a submersible pump will continuously operate underground for a long period of time. During the maintenance, the cables are found damaged. By cutting apart the used cables, it is often found that the damage of their sheaths allows liquid to enter the interior of the cables, and at a high temperature, the polypropylene insulating layer swells; and since the swollen insulating layer becomes soft and is decreased in its insulating strength, the core shift of the copper wire is caused, and as a result, local cable breakdown occurs.

For example, Chinese Patent Application 201610312692.2 disclosed a suspension-mountable submersible pump cable comprising a plurality of leads, a filling layer, a sheath layer and an armor layer, where each lead consists of a conductor located in the middle, an insulating layer wraps the conductor, and an oil-proof gasket layer surrounds the insulating layer; the plurality of leads are stranded together; a filler is filled between the leads and the filler wraps the plurality of leads to form the filling layer; and the sheath layer wraps the filling layer and the armor layer wraps the sheath layer.

Chinese Patent Application 201521065012.9 disclosed a submersible pump cable with two armor layers, where a tight insulating layer is provided around a copper conductor, a tight sheath layer is provided around an insulating layer, and the sheath layer is wrapped by an oil-proof gasket layer; and then three wire cores of such a structure are arranged side by side to form a first steel-tape armor layer, and then a second steel-tape armor layer is formed outside the first steel-tape armor layer.

Chinese Patent Application 201410098616.7 disclosed a circular submersible pump cable comprising a support core, a plurality of leads, a polytetrafluoroethylene wrapping layer, an oil-proof layer, a sheath layer and an armor layer, where each lead comprises a conductor located in the middle and an insulating layer wrapping the conductor; the cable core is wrapped by the polytetrafluoroethylene wrapping layer which is then wrapped by the oil-proof layer; and the oil-proof layer is wrapped by the sheath layer which is then wrapped by the armor layer.

With regard to the above submersible pump cables, an armor layer is provided outside the cables. This can fulfill the requirement on strength. However, since the armor layer is generally made of metal material, it is easily corroded by stratum corrosive media, especially hydrogen sulfide. Furthermore, this increases the production cost and is inconvenient to use.

Chinese Patent 201210283869.2 disclosed a longitudinal pressure-resistant sealed submersible pump cable with a stranded conductor, comprising a stranded conductor located in the central portion of the cable, and further comprising an insulating layer wrapping the stranded conductor, where the stranded conductor comprises a central conductor and surrounding conductors which are all stranded together; and a semi-conductive rubber filler is provided between the central conductor and the surrounding conductors. In this patent, the ointment filler in the conventional cables is replaced with the semi-conductive rubber. The possibility for the ointment to change into liquid from solid at normal temperature is avoided. In this solution, the weight of the cables is to be borne by their conductors. Therefore, the cables are quite easy to break due to their limited bearing capacity, and accordingly, it is impossible to produce a very long cable. Furthermore, the cables are less corrosion-resistant since the conductors are wrapped by a common insulating layer. And, due to the bearing requirement, the insulating layer must have a very large thickness which is almost ⅓ of the radius of the cables. The effective working space of the cables is heavily occupied by an insulating layer of such a large thickness, and the waste of space is caused. Therefore, such a cable is low in universal applicability.

Accordingly, in the prior art, there is a need for a cable used for submersible pump which can fulfill the requirements on both high bearing capacity and high corrosion-resistant performance.

SUMMARY

To overcome the defects in the prior art, the present application provides a reinforced cable used for submersible pump which exhibits high bearing capacity and excellent corrosion-resistant performance and also maximizes the effective working space of the cables.

The reinforced cable used for submersible pump of the present application consists of a fluororubber sheath, a filler, wire ropes and signal cables; the wire ropes and the signal cables are arranged in a central region of the cable; the filler is filled in the surrounding, and the fluororubber sheath is extruded outside the filler; and each of the signal cables comprises a conductor and an insulating bush which is extruded outside the conductor.

Preferably, the fluororubber sheath may be a F46 fluororubber sheath, and a sintered membrane may be formed on an outer wall of the conductor.

Preferably, there are four wire ropes and three signal cables, with one wire rope being arranged in the center of the cable, while the other three wire ropes and the three signal cables being uniformly arranged around the central wire rope; or there are three wire ropes and four signal cables, with one signal cable being arranged in the center of the cable, while the other three signal cables and the three wire ropes being uniformly arranged around the central signal cable.

Preferably, there are four wire ropes, and six signal cables each two of which are arranged in a radial direction as a group, with one wire rope being arranged in the center of the cable, while the other three wire ropes and the three groups of signal cables being uniformly arranged around the central wire rope; or there are four signal cables, and six wire ropes each two of which are arranged in a radial direction as a group, with one signal cable being arranged in the center of the cable, while the other three signal cables and the three groups of wire ropes being uniformly arranged around the central signal cable.

Preferably, there are five wire ropes and four signal cables, with one wire rope being arranged in the center of the cable, while the other four wire ropes and the four signal cables being uniformly arranged around the central wire rope; or there are four wire ropes and five signal cables, with one signal cable being arranged in the center of the cable, while the other four signal cables and the four wire ropes being uniformly arranged around the central signal cable.

Preferably, the fluororubber sheath has a thickness of 0.3-2 mm and a density of 2.0-2.5 $g/cm^3$; and a sintered membrane has a thickness of 0.1-0.5 mm and a density of 1.2-2.0 $g/cm^3$. The conductor has a diameter of 2-6 mm and the filler has a density of 1.0-1.5 $g/cm^3$. A rope casing is provided outside the wire rope; and the wire rope has a diameter of 6-12 mm and the rope casing has a thickness of 0.4-0.6 mm.

Preferably, the wire rope is formed by stranding a plurality of small wire ropes. A sum of a pitch of the small wire rope and a diameter of the conductor is less than a diameter of the wire rope.

Due to the arrangement of a wire rope for bearing, the reinforced cable used for submersible pump of the present application has a very high breaking load which can fulfill the bearing requirement for most submersible pumps; and no any armor layer or any coiled tubing is required on its outer surface, which avoids the corrosion from the stratum media, and also greatly reduces the usage cost and improves the convenience. Due to the application of fluororubber with high corrosion resistant performance on the outermost layer of the reinforced cable used for submersible pump of the present application, it can withstand the corrosion from the stratum media, especially hydrogen sulfide. The operating temperature may be as high as 200° C. The reinforced cable used for submersible pump of the present application exhibits excellent high-temperature and high-pressure resistant performance. The fluororubber sheath is quite thin, with a thickness of only 1/60 of the radius of the cable, and thus, a larger effective working space becomes possible. Such a cable may have a length of thousands of meters, and thus can be widely applied in submersible pumps. In the prior art, there has been no techniques of directly extruding a fluororubber sheath onto the outermost layer of a cable used for submersible pump.

DETAILED DESCRIPTION

To make the objectives, technical solutions and advantages of the present application clearer, the embodiments of the present application will be described below in detail with reference to the accompanying drawings. It is to be noted that the embodiments of the present application and the features in the embodiments may be combined arbitrarily if not conflicted.

Figure 1:
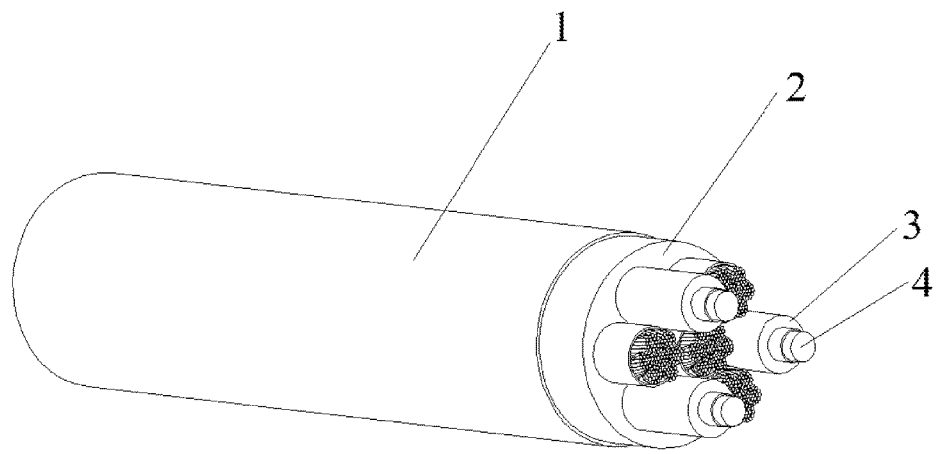
FIG. 1 is a stereoscopic view of an implementation of a reinforced cable used for submersible pump according to the present application.
Figure 2:
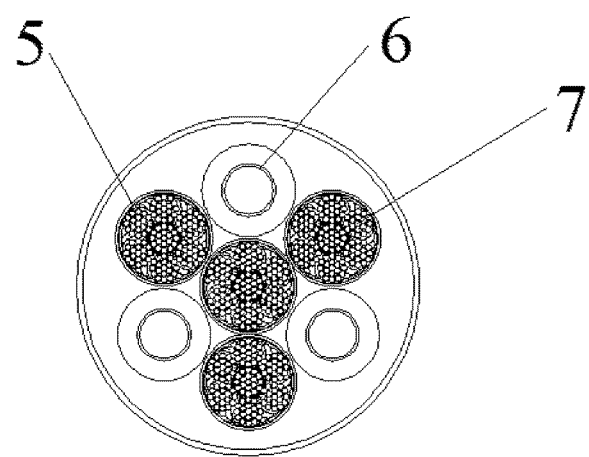
FIG. 2 is a cross-sectional view of an implementation of the reinforced cable used for submersible pump according to the present application.
Figure 3:
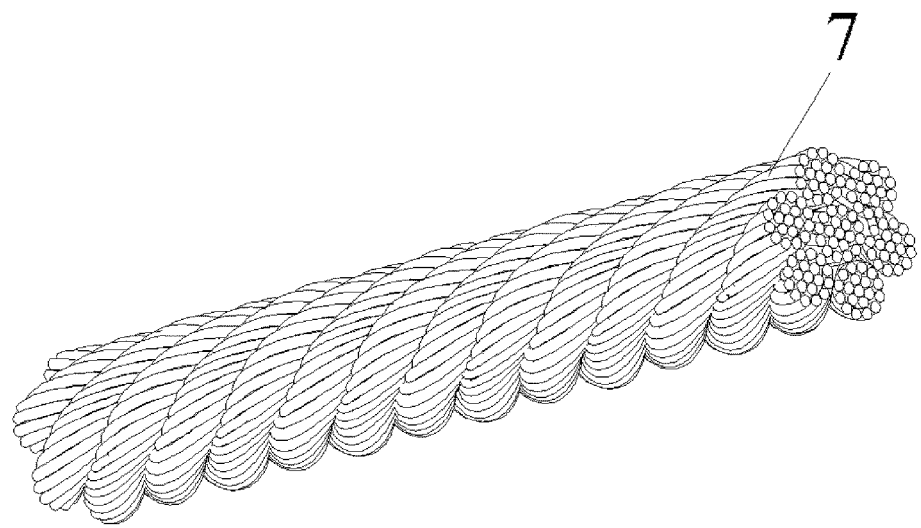
FIG. 3 is a stereoscopic view of a wire rope of the reinforced cable used for submersible pump according to the present application.
Figure 4:
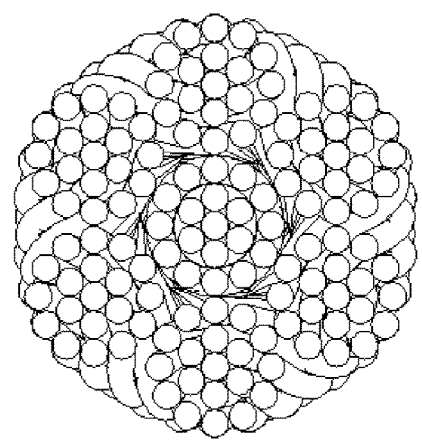
FIG. 4 is a cross-sectional view of the wire rope of the reinforced cable used for submersible pump according to the present application.

As shown in FIG. 1 and FIG. 2, a structural diagram of an implementation of the reinforced cable used for submersible pump of the present application is shown. As shown, the cable consists of a fluororubber sheath 1, a filler 2, a wire rope and a signal cable; the wire rope and the signal cable are arranged in a central region of the cable; and the filler 2 is filled in the surrounding, and the fluororubber sheath 1 is extruded outside the filler 2. The wire rope is formed by stranding a plurality of small wire ropes 7, and a rope casing 5 is provided outside the wire rope. The signal cable comprises a conductor 4 and an insulating bush 3, a sintered membrane 6 is formed on an outer wall of the conductor 4, and the insulating bush 3 is extruded outside the conductor 4.

The fluororubber sheath 1 in the present application may be made of F46 fluororubber. The F46 fluororubber is a copolymer of tetrafluoroethylene and hexafluoropropylene, i.e., fluorinated ethylene propylene (FEP), in which the content of hexafluoropropylene is about 15%. The F46 fluororubber, as modified material of polytetrafluoroethylene, can be continuously used below 200° C. The F46 fluororubber exhibits excellent chemical stability, and will not be corroded when coming into contact with other chemicals, except for the reaction with the fluoride element at high temperature, molten alkali metal, chlorine trifluoride and the like. And, in the prior art, there has been no solutions in which fluororubber, especially F46 fluororubber, is used as the sheath on the outermost layer of cables. The insulating bush in the present application may be a common polyethylene or polypropylene plastic bush, or may be an F46 fluororubber insulating bush. When an F46 fluororubber insulating bush is used, it has a thickness equal to or less than the thickness of the fluororubber sheath 1, for example, ½ or ⅔ of the thickness of the fluororubber sheath 1.

As shown in FIG. 1 and FIG. 2, there are four wire ropes and three signal cables, with one wire rope being arranged in the center of the cable, while the other three wire ropes and the three signal cables being uniformly arranged around the central wire rope. The wire ropes are arranged in a Y-shape and the signal cables are arranged in a regular triangle. Each small wire rope 7 is formed by stranding a plurality of wires, and the small wire ropes form, as a whole, a bearing component having an enough bearing capacity.

In the preferred implementation of the present application, the fluororubber sheath may have a thickness of 0.3-0.8 mm, preferably 0.5 mm, and a density of 2.0-2.5 g/cm$^3$, preferably 2.2 g/cm$^3$. The conductor 4 may have a diameter of 3-6 mm, for example 5 mm; the sintered membrane may have a thickness of 0.2-0.3 mm, preferably 0.23 mm, and a density of 1.2-2.0 g/cm$^3$, preferably 1.6 g/cm$^3$; and the insulating bush may have a thickness of 2-4 mm, preferably 2.5 mm. The wire rope has a diameter of 7-10 mm, preferably 8 mm; and the rope casing 5 has a thickness of 0.4-0.6 mm, for example, 0.5 mm. The filler has a density of 1.0-1.5 g/cm$^3$, preferably 1.3 g/cm$^3$. The cable used for submersible pump may have a total diameter of 20-30 mm.

Figure 5:
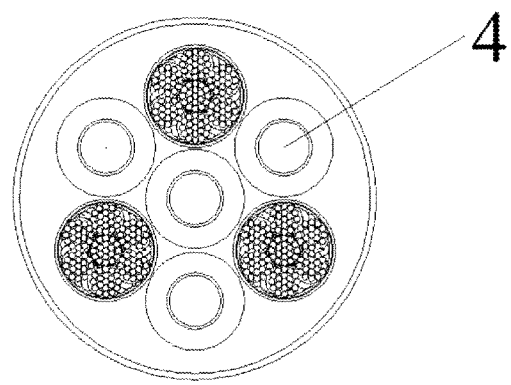
FIG. 5 is a cross-sectional view of a second implementation of the reinforced cable used for submersible pump according to the present application.
Figure 6:
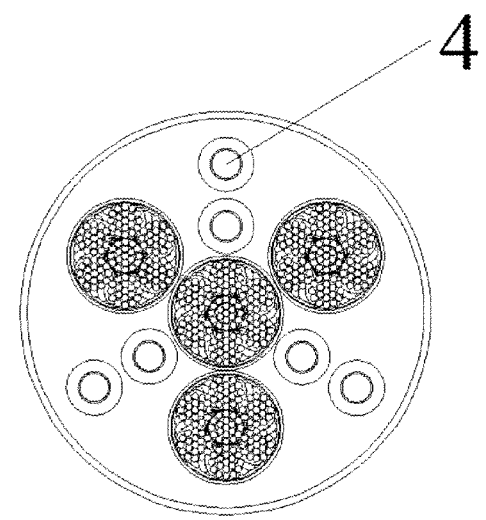
FIG. 6 is a cross-sectional view of a third implementation of the reinforced cable used for submersible pump according to the present application.
Figure 7:
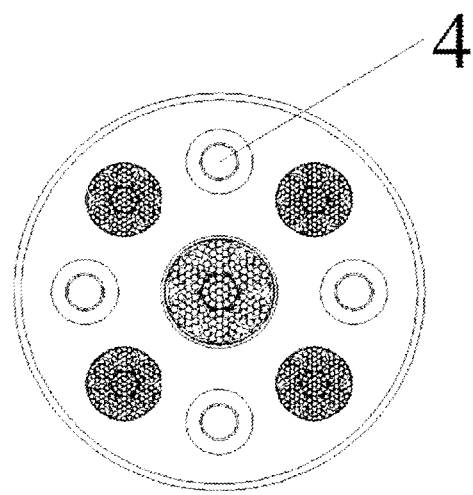
FIG. 7 is a cross-sectional view of a fourth implementation of the reinforced cable used for submersible pump according to the present application.

As shown in FIG. 5 to FIG. 7, cross-sectional views of another three implementations of the reinforced cable used for submersible pump of the present application are shown. As shown in FIG. 5, the positions of the wire ropes and the signal cables are interchanged with those in FIG. 2. The other arrangements are the same as FIG. 2. In this embodiment, the fluororubber sheath may have a thickness of 0.4-1.2 mm, preferably 0.8 mm, and a density of 2.0-2.5 g/cm$^3$, preferably 2.2 g/cm$^3$. The conductor 4 may have a diameter of 2-5 mm, for example 4 mm. The sintered membrane may have a thickness of 0.2-0.3 mm, preferably 0.23 mm, and a density of 1.2-2.0 g/cm$^3$, preferably 1.6 g/cm$^3$. The insulating bush may have a thickness of 1-3 mm, preferably 2 mm. The wire rope has a diameter of 8-12 mm, preferably 10 mm; and the rope casing 5 has a thickness of 0.5-0.8 mm, for example, 0.6 mm. The filler has a density of 1.0-1.5 g/cm$^3$, preferably 1.3 g/cm$^3$. The cable used for submersible pump may have a total diameter of 15-25 mm.

As shown in FIG. 6, there may be a plurality of signal cables in the radial direction of the cable, for example, two signal cables. The arrangement of the wire ropes is the same as FIG. 2. The conductor 4 may have a diameter of 1-3 mm, for example 2.5 mm. The insulating bush may have a thickness of 1.5-2.5 mm, preferably 2 mm. The wire rope has a diameter of 12-16 mm, preferably 15 mm; and the rope casing 5 has a thickness of 1-1.5 mm, for example, 1.2 mm. The cable used for submersible pump may have a total diameter of 25-40 mm.

As shown in FIG. 7, there are four wire ropes and four signal cables which are uniformly arranged in the circumferential direction of the cable. The conductor 4 may have a diameter of 4-8 mm, for example 6 mm; and the insulating bush may have a thickness of 3-4 mm, preferably 3 mm. The wire rope has a diameter of 6-10 mm, preferably 8 mm; and the rope casing 5 has a thickness of 2-3 mm, for example, 2.5 mm. The cable used for submersible pump may have a total diameter of 50-70 mm.

It is to be noted that the number of wire ropes and signal cables is only exemplary, and does not form any limitations to the protection scope of the present application. It should be understood by those skilled in the art that the specific number and arrangement of wire ropes and signal cables can be adjusted according to actual needs.

To ensure that the wire ropes have an enough bearing capacity, the pitch of the small wire rope, the diameter of the wire ropes and the diameter of the conductors should preferably fulfill the following condition: a sum of the pitch of the small wire rope and the diameter of the conductor is less than a diameter of the wire rope.

Although the implementations of the present application have been described above, the disclosed contents are merely implementations used for understanding, but not for limiting, the present application. It will be appreciated by a person of ordinary skill in the art that any modifications or changes may be made to the implementations in form or detail without departing from the spirit and scope of the present application. The patent protection scope of the present application is subject to the scope as defined in the appended claims.

The invention claimed is:

1. A reinforced cable used for submersible pump, consisting of a fluororubber sheath, a filler, wire ropes and signal cables,
    wherein the wire ropes and the signal cables are arranged in a central region of the cable, the filler is filled in the surrounding, and the fluororubber sheath is extruded outside the filler, and each of the signal cables comprises a conductor and an insulating bush which is extruded outside the conductor, and
    wherein a sintered membrane is provided on an outer wall of the conductor, a rope casing is provided outside the wire rope, and the wire rope has a diameter of 6-12 mm and the rope casing has a thickness of 0.4-0.6 mm.

2. The reinforced cable used for submersible pump according to claim 1, wherein the fluororubber sheath is a F46 fluororubber sheath.

3. The reinforced cable used for submersible pump according to claim 2, wherein there are four wire ropes and three signal cables, with one wire rope being arranged in the center of the cable, while the other three wire ropes and the three signal cables being uniformly arranged around the central wire rope; or
    there are three wire ropes and four signal cables, with one signal cable being arranged in the center of the cable, while the other three signal cables and the three wire ropes being uniformly arranged around the central signal cable.

4. The reinforced cable used for submersible pump according to claim 1, wherein the fluororubber sheath has a thickness of 0.3-2 mm and a density of 2.0-2.5 g/cm$^3$, and the sintered membrane has a thickness of 0.1-0.5 mm and a density of 1.2-2.0 g/cm$^3$.

5. The reinforced cable used for submersible pump according to claim 1, wherein the conductor has a diameter of 2-6 mm and the filler has a density of 1.0-1.5 g/cm$^3$.

6. The reinforced cable used for submersible pump according to claim 1, wherein the wire rope is formed by stranding a plurality of small wire ropes.

7. The reinforced cable used for submersible pump according to claim 6, wherein a sum of a pitch of the small wire rope and a diameter of the conductor is less than a diameter of the wire rope.

* * * * *